United States Patent
Wu

(10) Patent No.: US 6,922,407 B2
(45) Date of Patent: Jul. 26, 2005

(54) HOMEPNA 10M8 COMPLIANT TRANSCEIVER

(75) Inventor: Song Wu, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 901 days.

(21) Appl. No.: 09/782,538

(22) Filed: Feb. 12, 2001

(65) Prior Publication Data

US 2002/0003835 A1 Jan. 10, 2002

Related U.S. Application Data

(60) Provisional application No. 60/182,349, filed on Feb. 14, 2000.

(51) Int. Cl.[7] .............................................. H04L 12/403
(52) U.S. Cl. .................... 370/355; 370/400; 370/493
(58) Field of Search ................................ 370/204, 252, 370/352, 353, 354, 355, 357, 392, 400, 401, 404, 420, 465, 493, 286, 419, 437; 375/219, 285, 295, 296, 346, 352, 357; 714/752; 708/312; 329/90.01, 304

(56) References Cited

U.S. PATENT DOCUMENTS

| | | | | |
|---|---|---|---|---|
| 6,411,657 B1 | * | 6/2002 | Verbin et al. | 375/285 |
| 6,711,138 B1 | * | 3/2004 | Pai et al. | 370/257 |
| 6,754,294 B1 | * | 6/2004 | Adireddy et al. | 375/348 |
| 6,765,931 B1 | * | 7/2004 | Rabenko et al. | 370/493 |
| 6,788,236 B2 | * | 9/2004 | Erdogan et al. | 341/155 |
| 6,792,049 B1 | * | 9/2004 | Bao et al. | 375/285 |
| 2002/0019966 A1 | * | 2/2002 | Yagil et al. | 714/752 |
| 2002/0061012 A1 | * | 5/2002 | Thi et al. | 370/352 |
| 2003/0174761 A1 | * | 9/2003 | Huang et al. | 375/219 |
| 2003/0181185 A1 | * | 9/2003 | Lusky et al. | 455/295 |
| 2003/0194241 A1 | * | 10/2003 | Farmer | 398/167.5 |
| 2004/0161056 A1 | * | 8/2004 | Jun et al. | 375/326 |

FOREIGN PATENT DOCUMENTS

WO    WO 99/23789 A1    5/1999

OTHER PUBLICATIONS

Frank, Edward H., et al., "Connecting the Home with a Phone Line Network Chip Set," IEEE MICRO, IEEE Inc., New York, NY, vol. 20, No. 2, Mar. 2000, pp. 27–38, XP000908494, ISSN: 0272–1732.

White Paper: "Simple, High–Speed Ethernet Technology for the Home," The Home Phoneline Networking Alliance, Jun. 1998, pp. 1–11, XP002115825.

"Ethernet Uebers Heimische Telefonnetz," Elektronik, Franzis Verlag GmbH, Munchen, DE, vol. 48, No. 7, Aug. 24, 1999, pp. 20, 22, XP000931024.

Bach, Rolf, "Powerline–Loesungen in den USA, Neue Chips Fuer die Gebaeude–Automatisierung," Elektronik, Franzis Verlag GmbH, Munchen, DE, vol. 47, No. 17, Aug. 18, 1998, pp. 78–81, XP000847931, ISSN: 0013–5658.

* cited by examiner

*Primary Examiner*—Phirin Sam
(74) *Attorney, Agent, or Firm*—J. Dennis Moore; W. James Brady, III; Frederick J. Telecky, Jr.

(57) ABSTRACT

The present invention provides a method and system of transceiving a data signal in a HomePNA type network. The transceiver enables digital signal processing of the data signal compliant with the HomePNA 10M8 specification in an Open System Interconnection type network over a shared medium such as a client's home phoneline (1206). The transceiver can be implemented in each station (1202) of the HomePNA single-segment network (1204) in which each station is logically connected to the same shared channel on the phonewire (1206). The transceiver enables transmission of the data signal in burst on the shared channel while complying with the spectral mask (310), temporal mask (330) and other electrical requirements as specified in the HomePNA 10M8 technology.

13 Claims, 5 Drawing Sheets

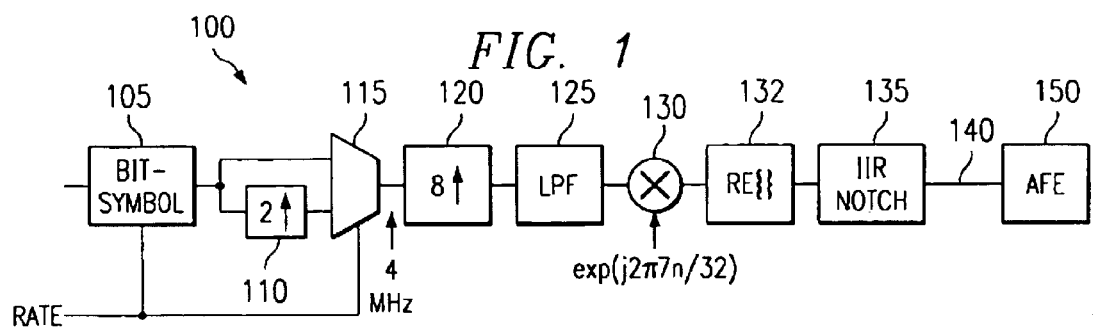
FIG. 1
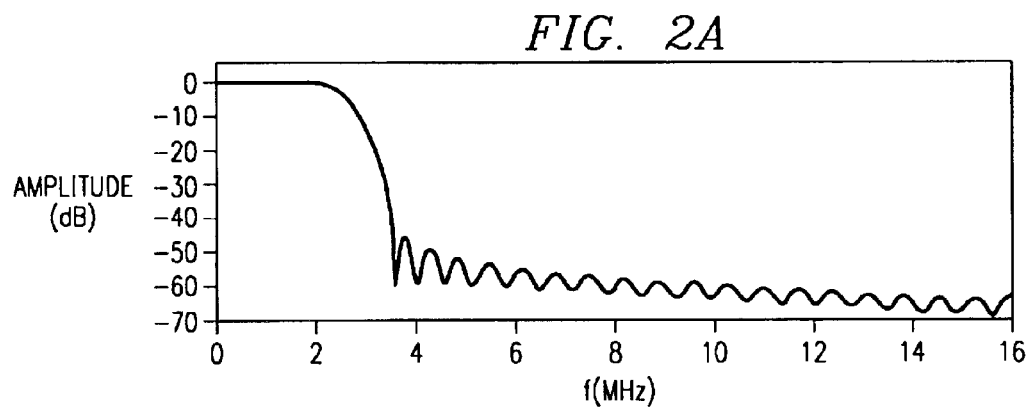
FIG. 2A
FIG. 2B
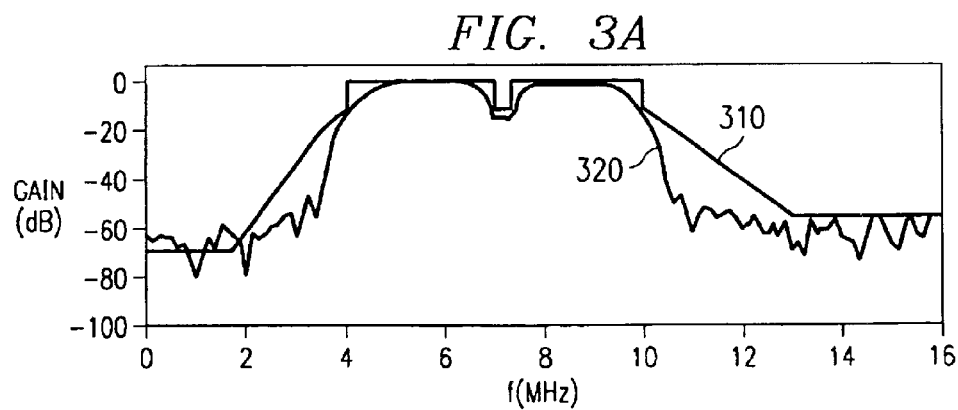
FIG. 3A

| SNR AT THE OUTPUT OF EQUALIZER | | |
|---|---|---|
| TEST LOOPS | 2 Mbaud | 4 Mbaud |
| LOOP #1 | 50 dB | 30 dB |
| LOOP #2 | 35 dB | 25 dB |
| LOOP #3 | 35 dB | 30 dB |
| LOOP #4 | 35 dB | 27 dB |
| LOOP #5 | 40 dB | 27 dB |
| LOOP #6 | 30 dB | 25 dB |
| LOOP #7 | 32 dB | 22 dB |
| LOOP #8 | 40 dB | 28 dB |
| LOOP #9 | 30 dB | 22 dB |
| LOOP #10 | 25 dB | 15 dB |

FIG. 12 (KNOWN)

HOMEPNA 10M8 COMPLIANT TRANSCEIVER

The invention is related to and claims priority under 35 USC 1 19(e)(1) from the following co-pending U.S. Provisional Patent Application: Ser. No. 60/182,349 by Song Wu, entitled, "DSP algorithms for implementing HPNA 10M8 Transceiver," and filed on Feb. 14, 2000. The aforementioned patent application is hereby incorporated by reference.

BACKGROUND OF THE INVENTION

1. Technical Field of the Invention

The present invention relates generally to the field of communication networks and, more particularly, to a transceiver method and architecture in a home phoneline network.

2. Description of the Related Art

The Home Phoneline Networking Alliance (HomePNA) is an association of industry leading companies working together to bring, for example, easy-to-use, high-speed, affordable home networking solutions to clients by providing the manageable tools needed to utilize phoneline networking. Hpna 2.0 is the second-generation home phoneline networking technology specification released by the Alliance. The new specification brings a faster 10 Mb/s technology (also known as 10M8 technology) to phoneline networking, while at the same time maintaining backward compatibility with existing 1 Mb/s HomePNA technology. Some of the advantages of the Alliance's latest 10 Mb/s technology include allowing for faster, real-time multiplayer gaming, swift downloading of complex files and graph images from the Internet as well as simultaneous shared access to peripherals such as printers. Clients can enjoy all these home entertainment and information services using existing wiring in the home.

SUMMARY OF THE INVENTION

The present invention achieves technical advantages as a method and system of transceiving a data signal in a HomePNA type network. The transceiver enables digital signal processing, of the data signal, compliant with the HomePNA 10M8 specification in an Open System Interconnection type network over a shared medium, such as a client's home phoneline. The transceiver can be implemented in each station of the HomePNA single-segment network in which the stations are logically connected to the same shared channel on the phoneline. The transceiver enables transmission of the data signal in burst on the shared channel while complying with the spectral mask, temporal mask, and other electrical requirements as specified in the HomePNA 10M8 technology.

BRIEF DESCRIPTION OF THE DRAWINGS

For a more complete understanding of the present invention, reference is made to the following detailed description taken in conjunction with the accompanying drawings wherein:

FIG. 1 illustrates a digital signal processing functional block diagram of a transmitter signal portion of a transceiver in accordance with an exemplary embodiment of the present invention;

FIG. 2A illustrates a frequency response of an exemplary FIR filter in accordance with the present invention;

FIG. 2B illustrates a temporal response associated with the frequency response, of the exemplary FIR filter, as illustrated in FIG. 2A;

FIG. 3A illustrates a spectrum shape of a digitally filtered signal at an output of an exemplary notch filter in accordance with the present invention;

FIG. 12 illustrates a 10M8 single-segment network utilizing 10M8 compliant transmission devices.

DETAILED DESCRIPTION OF THE INVENTION

Figure 3B:
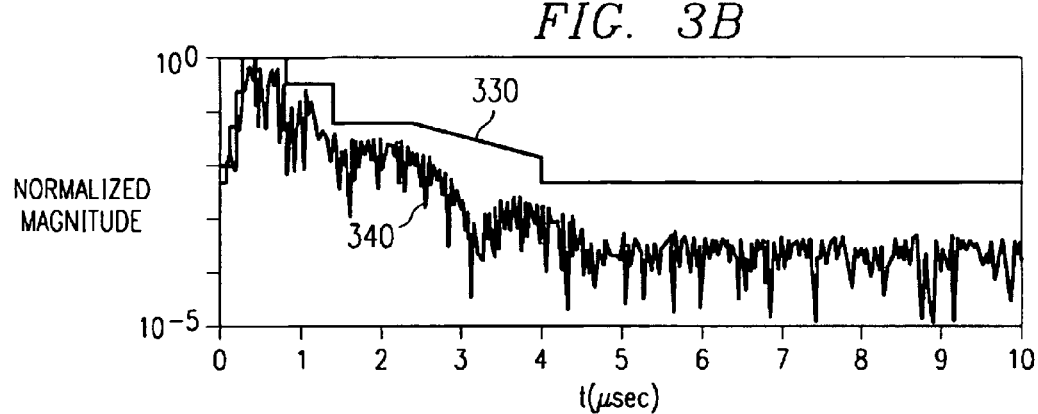
FIG. 3B illustrates a temporal shape associated with the spectrum shape, of the digitally filtered signal, as illustrated in FIG. 3A.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Referring to FIG. 12 there is illustrated a 10M8 system implementing 10M8 compliant devices 1202 on a "shared medium" single-segment network 1204. All compliant devices 1202 are logically connected to the same shared channel on the phonewire 1206. Multiple 10M8 network segments and other network links can be connected through ISO network Data Link Layer (L2 Bridge) or through a Router Gateway (L3). The Router Gateway L3 can interconnect a wide-area network link to the in-house 10M8 network 1204. Such wide-area link might be provided via subscriber line (V.90, ISDN, G.992), cable (DOCSIS) or wireless link. Also, the L2 Bridge can connect the 10M8 network 1204 with other 10M8 network segments or IEEE 802.3 (10BASE-T, 100BASE-T) networks. The 10M8 network standard is designed to work over "as is" client premises wiring (which is generally a twisted pair) and, therefore, must compete with other technologies and multiple noise sources. The present application describes a HomePNA 10M8 compliant transceiver for use in a 10M8 system.

The present application is organized into transmitter, receiver and channel response sections. In both transmitter and receiver sections, only the issues related to digital signal processing are addressed, the issues in link layer, MAC, PHY and AFE are not discussed in detail, however, for a further discussion on these topics and others related to the present invention reference can be made to, Home Phoneline Networking Alliance, Interface Specification for HomePNA 2.0 10M8 Technology, 1999, and later versions, the description of which is hereby incorporated by reference.

Referring now to FIG. 1 there is illustrated a digital signal processing functional block diagram of a transmitter signaling portion (hereinafter referred to as transmitter) 100 of a transceiver in accordance with an exemplary embodiment of the present invention. Starting at a bit-to-symbol mapping block or encoder 105, the data stream is received from a Media Access Controller (MAC) in, for example, a conventional Open System Interconnection type system, and is converted to symbols for filtering and modulation, and terminates at the Infinite Impulse Response (IIR) notch filter block 135. The modulated signal at the output 140 of the transmitter path meets or exceeds the PSD mask and temporal mask specified in the 10M8 (Transmitter Electrical Specification). The samples at the output 140 of IIR notch 135 are sent to an AFE (analog front end) 150 line interface for digital-to-analog conversion and analog filtering. In some embodiments, the interface between the digital signal processing core and the AFE 150 is 12 bits operating at 32 MHz sampling rate.

According to the 10M8 specification, the highest corner frequency is around 13 MHz, therefore, the sampling rate of the output signal should be higher than 26 MHz. Also, since a 10M8 compliant device must support both 2 and 4 Mbaud, the master clock in accordance with the present invention can be advantageously chosen as 32 MHz for convenient up/down conversions.

Bit-to-symbol mapping is well-known as described in 10M8 section 2.5. The sampling rate of the bit-symbol constellation encoder 105 output is either at 2 MHz or 4 MHz depending on the symbol rate defined in the payload encoding (PE) field from the MAC. The 2 MHz and 4 MHz outputs are combined at a multiplexor 115 where the 2 MHz output is up converted (110). The sampling rate of the output is further converted to the preselected 32 MHz master clock rate by up sampling (120), and the output of the upsampler is coupled to a Low Pass Filter (LPF) 125.

The LPF 125 is an asymmetrical Finite Impulse Response (FIR) filter operating at 32 MHz. The aysmmetrical FIR is chosen to assist with temperal requirements of the HomePNA specification. In some embodiments, the filter 125 has 52 real taps. Since the input of the filter is 4 MHz, the filter can be treated as an eight-phase poly-phase filter with 13 taps per phase. The complex output of the LPF 125 is modulated to a real pass-band signal centered at 7 MHz by a digital modulator 130. The purpose of the LPF 125 is to make the spectrum at the output of the modulator 130 meet the HomePNA Power Spectral Density (PSD) mask requirements at 4, 10 and 13 MHz frequency points without attempting to meet the requirement at 2 and 7 MHz. A notch filter 135 resolves the PSD mask requirement at 7 MHz and an analog filter associated with the AFE 150 resolves the 2 MHz PSD mask requirements. This partitioning of the resolution of PSD mask lowers the overall cost for a transceiver.

In some embodiments, the length of the LPF impulse response is constrained to give a sharp envelope rising edge as required in the 10M8 specification section 1.1.3. Traditional linear phase symmetrical filters are generally not able to meet this requirement. Therefore, in accordance with the present invention, a FIR filter without linear phase constraint can be designed to meet the specification. The frequency and temporal response of an exemplary FIR filter, in accordance with the present invention, are shown in FIGS. 2A and 2B, respectively, and the associated filter tap coefficients, beginning with TAP 0, are as follows:

−0.001735
−0.003212
−0.003795
−0.001801
0.004699
0.017435
0.037210
0.063392
0.093526
0.123527
0.148233
0.162509
0.162399
0.146303
0.115554
0.074477
0.029558
−0.011816
−0.043042
−0.059699
−0.060566
−0.047728
−0.026005
−0.001602
0.019379
0.032445
0.035563
0.029447
0.016994
0.002328
−0.010486
−0.018444
−0.020302
−0.016596
−0.009283
−0.000927
−0.006047
0.010060
0.010607
0.008266
0.004265
0.000066
−0.003162
−0.004767
−0.004739
−0.003515
−0.001792
−0.000194
0.000844
0.001223
0.001057
0.000628.

The digital modulator 130 receives the base-band complex signal from the LPF 125 output and converts it to a pass-band real signal 132. The mathematical operation for 32 MHz sampling rate is as follows:

$$Re\{(I(n)+jQ(n))\cdot \exp(j2\pi 7n/32)\}=I(n)\cdot \cos(2\pi 7n/32)-Q(n)\cdot \sin(2\pi 7n/32).$$

The notch filter 135 receives the pass-band real signal 132 and produces the output samples to the AFE 150. The IIR notch filter 135 is designed to produce a notch at about 7 MHz to meet the 10M8 PSD specification. The sampling rate for the IIR filter 135 is at 32 MHz and exemplary filter tap coefficients are as follows:

| b | a |
|---|---|
| 0.649819 | 1 |
| −1.723104 | −1.945252 |
| 2.811519 | 3.245981 |
| −3.459699 | −3.390466 |
| 2.727534 | 2.553050 |
| −1.605442 | −1.370183 |
| 0.599372 | 0.424912 | where $$y_n - \sum_k b_k y_{n-k} = \sum_l a_l x_{n-l}.$$

At the output of the IIR notch filter 135, digital shaping has finished the majority of the PSD mask work (4, 7, 10 and 13 MHz). The 2 MHz PSD mask requirements are resolved later in an analog filter associated with the AFE 150. The spectrum and temporal shape of the digitally filtered signal produced by an exemplary embodiment of the notch filter 135 are shown in FIGS. 3A and 3B. The spectrum and temporal shape per the 10M8 specification are shown at 310 and 330, respectively. The spectrum and temporal shape of the notch filter output are shown at 320 and 340, respectively. The curves are plotted with 12 bit samples operating at 32 MHz.

Figure 4:
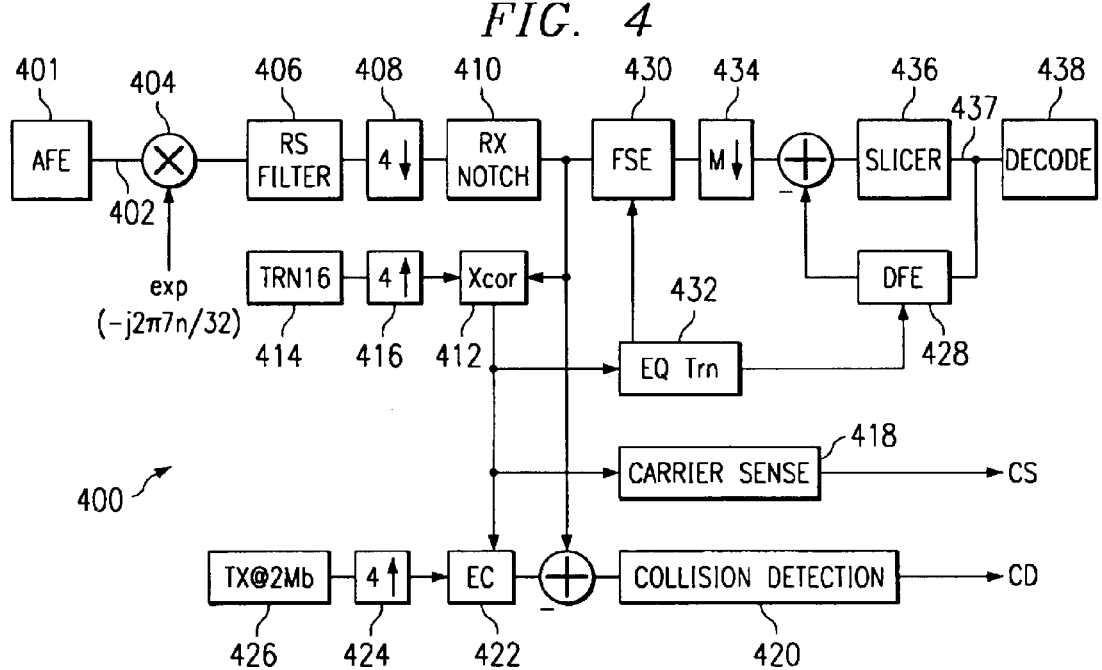
FIG. 4 illustrates a functional block diagram of a receiver signal portion of a transceiver in accordance with an exemplary embodiment of the present invention.

Referring now to FIG. 4 there is illustrated an exemplary embodiment of a receiver path portion (hereinafter referred to as receiver) 400 of a transceiver in accordance with the present invention. The receiver 400 receives data from an analog front-end output 402. In an exemplary embodiment, the receiver 400 is implemented in an integrated chip. The receiver 400 receives data sampled at 32 MHz, which carries the pass-band signal from the AFE 401.

A digital demodulator 404 downconverts the pass-band signal received from the AFE 401 to the base-band. The down converter operates in the complex domain, and the mathematical formula is as follows:

$$S(n)\cdot \exp(-j2\pi 7n/32)=S(n)\cos(2\pi 7n/32)-S(n)\sin(2\pi 7n/32).$$

Since the down conversion is a linear operation, all the signals and noise are circular shifting in the frequency domain. For the complex base-band signal, the negative frequency component carries valid information not having to be related to the information in the positive frequency component. For example, the ingress at 4 MHz is shifted to −3 MHz; the ingress at 10 MHz is now at 3 MHz; the in-band ingress 7–7.3 MHz is now at 0–0.3 MHz; and the ADSL signal at 0–1 MHz is now at −7 to −8 MHz. A complex filter operating in the base-band can therefore filter out the RFI ingress, xDSL signal and quantization noise from digital-to-analog conversion processes.

Figure 5A:
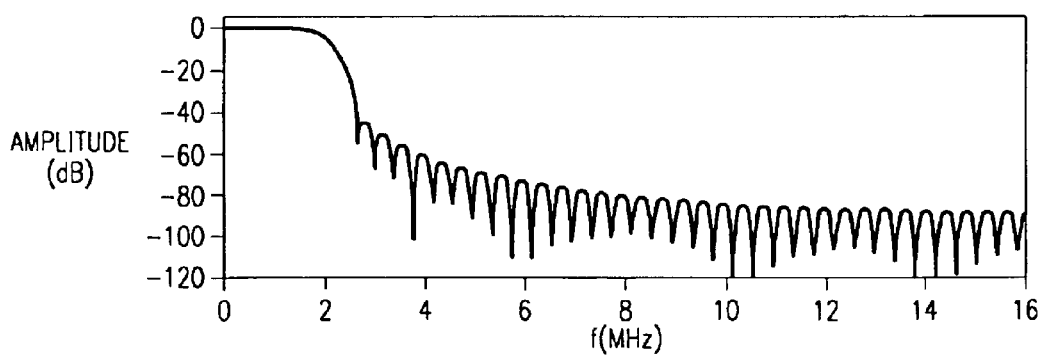
FIG. 5A illustrates a frequency response of an exemplary raise-cosine filter in accordance with an aspect of the present invention.
Figure 5B:
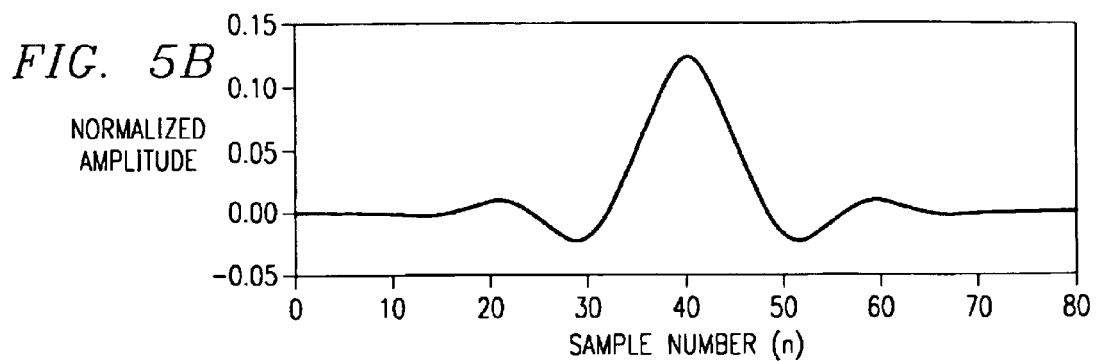
FIG. 5B illustrates an impulse response associated with the frequency response, of the exemplary raise-cosine filter, illustrated in FIG. 5A.

A raised-cosine (RS) filter 406 operates as a real, low-pass filter in the base-band to effectively filter out the down-converted noise. Since the information only covers from −3 MHz to 3 MHz in the base-band, the sample rate of the RS filter 406 output can be at 8 MHz, although the complex input signal is at 32 MHz from the output of the down-converter. To meet the requirement of immunity to narrow band interference, the stop-band attenuation of the RS filter 406 beyond 3 MHz is, in some embodiments, designed to be less than 50 dB. The frequency and impulse response of an exemplary embodiment of the RS filter 406 is shown in FIGS. 5A and 5B, respectively. Due to the low-pass nature of the RS filter 406, the output can be decimated (408) to 8 MHz.

Figure 6:
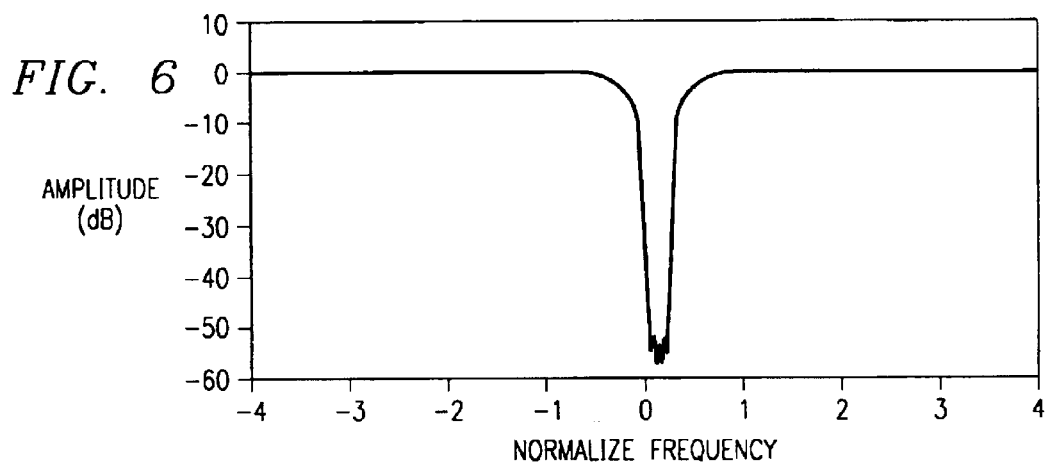
FIG. 6 illustrates a frequency response of an exemplary notch filter in accordance with an aspect of the present invention.

A receiver notch filter 410 operating at 8 MHz is designed to reject the in-band ingress (7.0–7.3 MHz in the air). The stop-band attenuation has to be greater than 50 dB to meet the applicable 10M8 specification section. One example of the notch filter is shown in FIG. 6. In some embodiments, the filter 410 is an IIR filter with 7 complex feed forward taps and 6 complex feed back taps. At the notch filter output, the in-band and out-band interference is filtered out. The signal is clean except for inter-symbol interference (ISI) which is addressed with decision-feedback equalization described in a later section of the present detailed description. At this stage, the signal is further used for carrier sensing, collision detection, timing and gain loop control, and adaptive equalization.

A cross-correlation (Xcor) device 412 operates at 8 MHz output from the receiver notch filter 410. It is to compute the cross correlation function between the incoming signal and the up-sampled (416) 8 MHz native TRN16 signal (414). The TRN16 is a 16 symbol white, constant amplitude QPSK sequence which is used in the PHY layer preamble. The cross correlation function is used, for example, for carrier sensing, collision detection and adaptive equalization. Noting that the TRN16 signal is orthogonal to any circular shift of itself, i.e.

$$\sum_{n=0}^{15} TRN16^*_{n-j}\, TRN16_{n-k} = \delta_{j,k},$$

the output of Xcor 412 gives the channel impulse response sampled at 8 MHz, when the TRN16 is received in the signal stream.

Figure 7:
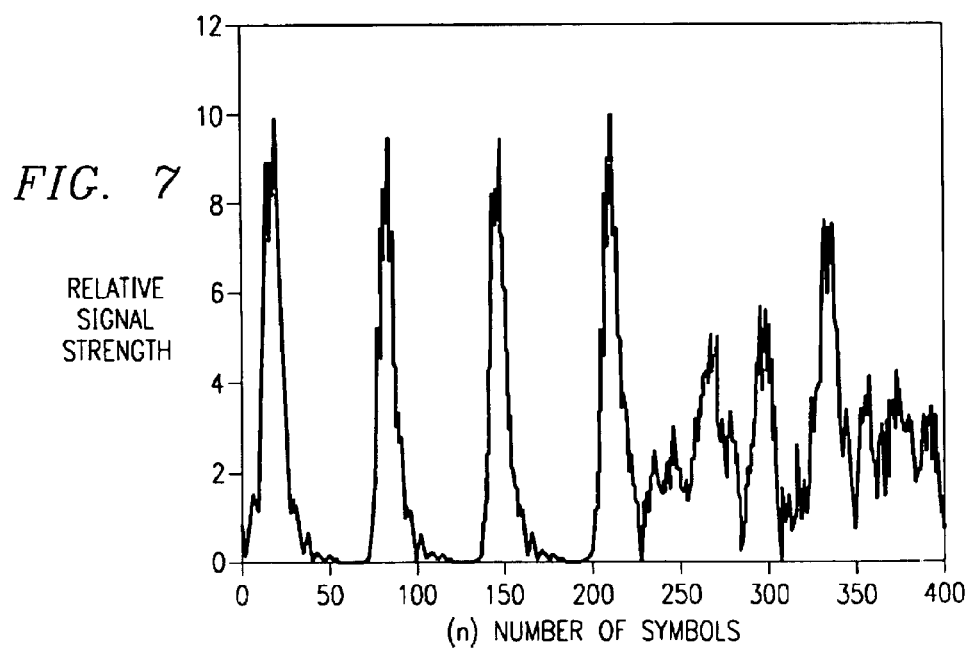
FIG. 7 illustrates a signal output of an exemplary cross-correlation device in accordance with an aspect of the present invention.

A carrier sensor 418 monitors the output of the cross-correlation function from Xcor 412. Since there are 4 repetitive TRN16s in the preamble, if the valid frame is received, one should expect 4 impulses separated by a 16 symbol-period at the Xcor output as exemplified in FIG. 7. Once the 4-impulse pattern appears, it may indicate the starting of a valid frame. The complete carrier sensing function does not finish until the end-of-frame (EOF) signal is received. A valid carrier sensing (CS) frame is confirmed by measuring the applicable properties described in the 10M8 specification. Since missing detection causes much greater damage than false alarming, it is preferable to start the carrier sensing process as soon as the 4 repetitive impulses are detected. Also, if a signal needs to be sent in the transmitter, after detection of the EOF, the signal is sent to the inter-frame gap (IFG) as described in the 10M8 specification. Therefore, the latency from receiver 400 to transmitter 100 is bounded by the IFG.

Figure 8A:
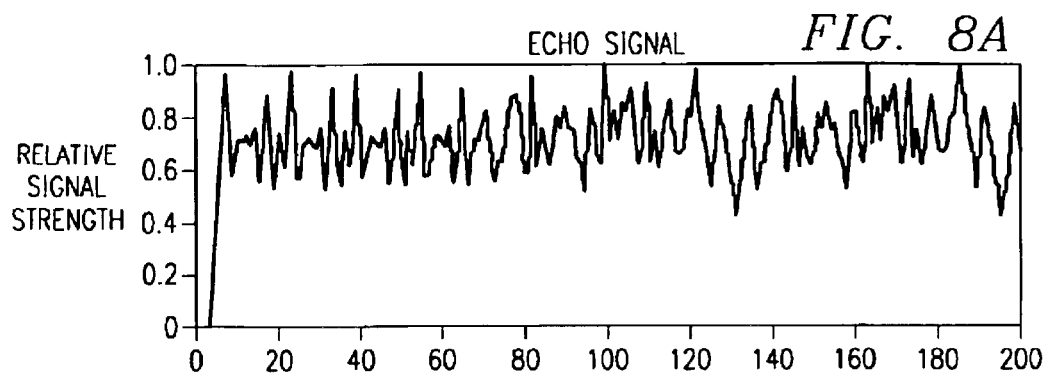
FIG. 8 illustrates a exemplary echo signal and resultant residual echo signal from an exemplary echo cancellor in accordance with an aspect of the present invention.
Figure 8B:
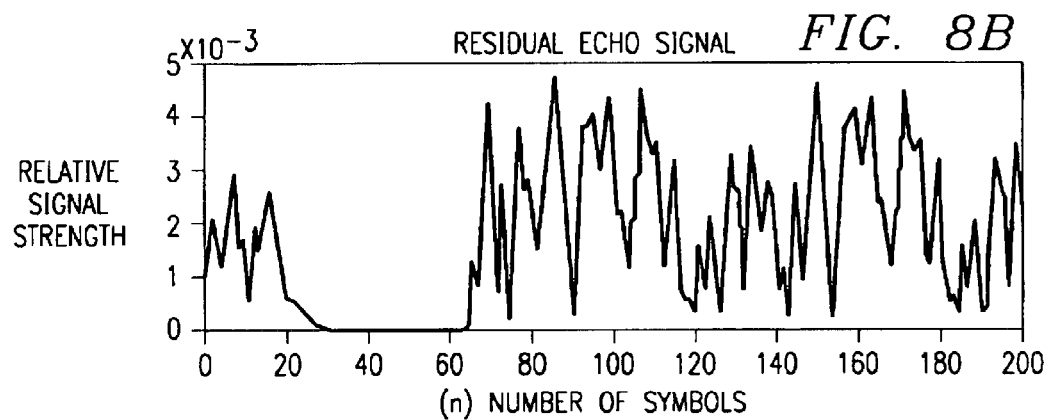

A collision detection device 420 is used to check if an outgoing transmission signal from an associated transceiver collides with any transmission signals from other stations. For example, when a transceiver sends a signal to the wire, on its receiver path it will receive echoes from the hybrid circuit in the AFE 401. Typically, the hybrid loss is less than −10 dB. Therefore, the received echo signal could be significantly stronger than a colliding signal from another station, for example, that is attenuated by greater than −30 dB. In accordance with the present invention, to detect the weaker colliding signal, the echo signal from the transceiver is removed with an echo cancellor (EC) 422. In some embodiments, the taps of the echo cancellor 422 are the echo channel's impulse response. At a transmitter, a preamble starts each transmission frame. The echo path is estimated at the beginning of each frame at the Xcor 412 output when the preamble signal is echoed back. Transmitter block 426 provides at least the preamble of a transmitted signal that could be echoed back. The transmitted signal is subsequently upsampled (424) to 8 MHz. However, since there are 16 2 Mbaud symbols in TRN16, the maximum length of the estimated echo channel is 64 8 MHz samples and is practically longer than the length of the echo channel. The power of residue echo is less than −40 dB, as shown in FIG. 8. The output of echo cancellor 422 is subtracted from the received signal, and the result is applied to the collision detector, which can use conventional techniques to produce a collision detection signal CD.

A decision-feedback equalizer scheme is used to cancel the channel inter-symbol interference (ISI) from, for example, spectrum nulls that can locate inside the 4–10 MHz transmission band due to the multiple reflections from any unterminated stubs. In the 10M8 specification, 2 and 4 Mbauds are specified for different channel conditions. For one particular receiving frame, the baud rate of the pay-load is not known until the pay-load encoding (PE) field is received. Therefore, two equalizers designed to work at 2 and 4 Mbauds have to be trained (432) before the PE field is received. The equalizers include a fractional spaced feed forward equalizer (FSE) 430 operating at 8 MHz and a symbol rate based decision feedback equalizer (DFE) 428 operating at 4 or 2 MHz. The PE determines whether the DFE 428 operates at 2 or 4 MHz and the FSE 430 is downconverted to 2 or 4 MHz (434) based on the same results. Both FSE 430 and DFE 428 are complex filters. In some embodiments, the length of the FSE is chosen as K=14 (number of taps), and the length of the DFE is chosen as L=20 (number of taps) for 4 Mbaud symbol rate and L=10 for 2 Mbaud symbol rate.

A received packet can come from a number of different stations. Even if the packet comes from a previous known station, the subsequent channel from that station can vary with time when, for example, the telephone goes on/off hook. Therefore, for each packet, the receiver 400 trains the FSE 430 and DFE 428 during the preamble period before it can decode the header information. However, as discussed above, since the channel impulse response can be obtained at the output of the Xcor 412, fast algorithms can accommodate equalizer training (432) quickly. An exemplary fast training algorithm is described below.

For convenience of discussion, the following notations are defined as:

$b_k$, k=0 . . . K−1, feed forward taps (for FSE),
$a_l$, l=1 . . . L, feed back taps (for DFE),
$y_n$, received signal before equalizer,
$x_n$, symbol transmitted, and
$v_n$, noise before slicer,
$h_t$, t=0 . . . T−1, channel impulse response taps.

The signal at the output 437 of the decision feedback-equalizer scheme is $$z_n = \sum_{k=0}^{k-1} b_k y_{n-k} + \sum_{l=1}^{L} a_l x_{n-l} + v_n,$$ Equation 1 and the error at the slicer 436 is $$e_n = x_n - z_n$$ Equation 2

$$= x_n - \sum_{k=0}^{k-1} b_k y_{n-k} - \sum_{l=1}^{L} a_l x_{n-l}.$$

The equalizer coefficients a and b are obtained by minimizing the power of $$\text{errorE} = E[e_n^* e_n],$$

i.e., using least mean square (LMS) error criteria. The equalizer coefficients a and b are then determined by:

$$\frac{\partial E}{\partial a_i} = 0; \text{ and}$$

$$\frac{\partial E}{\partial b_j} = 0.$$

From equation (2), one can derive $$\frac{\partial E}{\partial a_i} = E[x_{n-i}^* x_n] - \sum_{l=1}^{L} a_l E[x_{n-i}^* x_{n-l}] - \sum_{k=0}^{K-1} b_k E[x_{n-i}^* y_{n-k}],$$ Equation 4

$i = 1, \cdots, L$ and $$\frac{\partial E}{\partial b_j} = E[y_{n-j}^* x_n] - \sum_{l=1}^{L} a_l E[y_{n-j}^* x_{n-l}] - \sum_{k=0}^{K-1} b_k E[y_{n-j}^* y_{n-k}],$$ Equation 5

$j = 0, \cdots, K-1$

In the preamble period, auto-correlation can be estimated using the TRN16 signal as $$E[x_{n-i}^* x_{n-l}] = \sum_{n=0}^{15} x_{n-i}^* x_{n-l} = \delta_{i,l},$$

and the cross-correlation as $$E[x_{n-i}^* y_{n-k}] = \sum_{n=0}^{15} x_{n-i}^* \sum_{t} h_t \cdot x_{n-k-t} = h_{i-k},$$

considering $$y_n = \sum_{t} h_t \cdot x_{n-t}.$$

Then equation (4) and (5) reduce to

−[A]−[$h_{i-k}$][B]=0, i=1 . . . , L; k=0, . . . , K−1, and  Equation 6

[$h^*_{-j}$]−[$h^*_{i-k}$][A]−[$yy_{j,k}$][B]=0, j=0, . . . , K−1,  Equation 7 where, [A] is a L×1 matrix of $a_l$, [B] is a K×1 matrix of $b_k$, and $\lfloor yy_{j,k} \rfloor$ is a K×K auto-correlation matrix of the receiving signal y.

Theoretically, A and B can be solved by $$[A] = -[h_{i-k}][B], \text{ and}$$

$$[B] = ([yy_{j,k}] + [h_{i-k}][h_{i-k}])^{-1} \cdot [h^*_{-j}].$$

However, practically the eignvalues of the matrix could be close to zero and the inversion of the matrix could be numerically unstable. Also, the computation for the inverse of a matrix is not implementation friendly. An alternative solution is to derive $a_1$ as a function of $b_k$ based on equation (6) as $$a_l = -\sum_{k=0}^{K} h_{l-k} b_k. \quad \text{Equation 9}$$

And substitute equation (9) into equation (2)

$$e_n = x_n - \sum_{k=0}^{K} b_k y_{n-k} - \sum_{l=1}^{L} a_l x_{n-l} \quad \text{Equation 2}$$

$$= x_n - \sum_{k=0}^{K} b_k \left( y_{n-k} - \sum_{l=1}^{L} h_{l-k} x_{n-l} \right)$$

and $b_k$ is solvable numerically with the conventional gradient search algorithm, $$b_k(n+1) = b_k(n) + \text{step} * e_n * \left( y_{n-k} - \sum_{l=1}^{L} h_{l-k} x_{n-l} \right)^*$$

Figure 9:
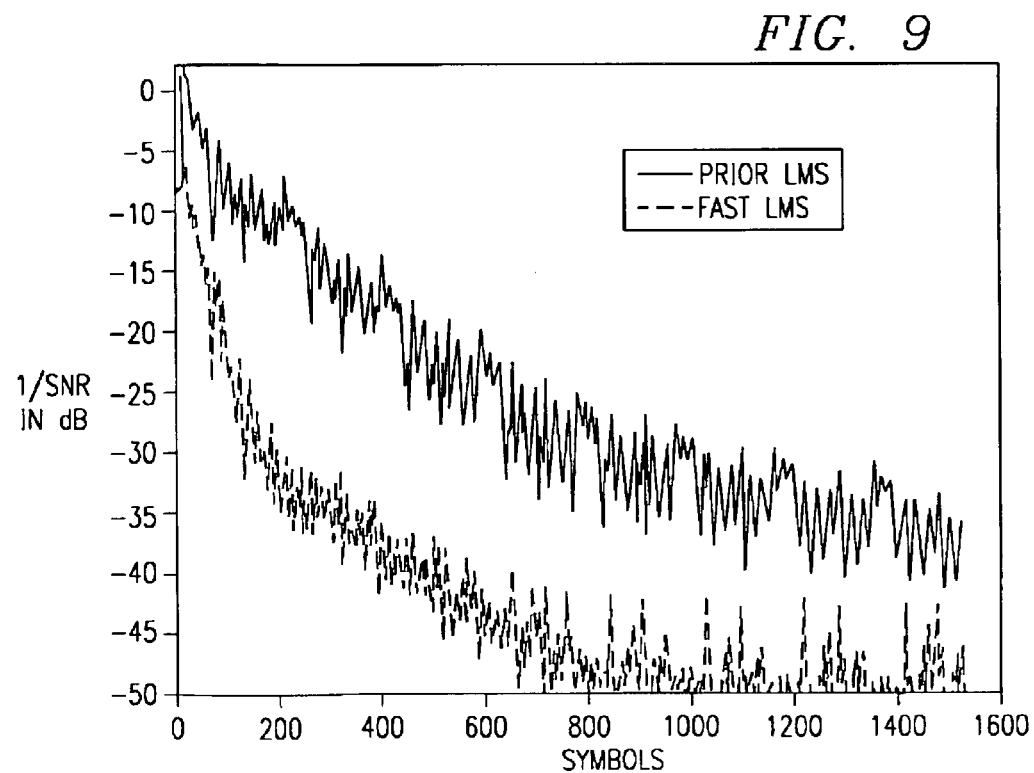
FIG. 9 illustrates a comparison of the convergent speed of an exemplary fast LMS algorithm in accordance with the present invention, and a typical LMS algorithm operating at 2 Mbaud.
Figure 10:
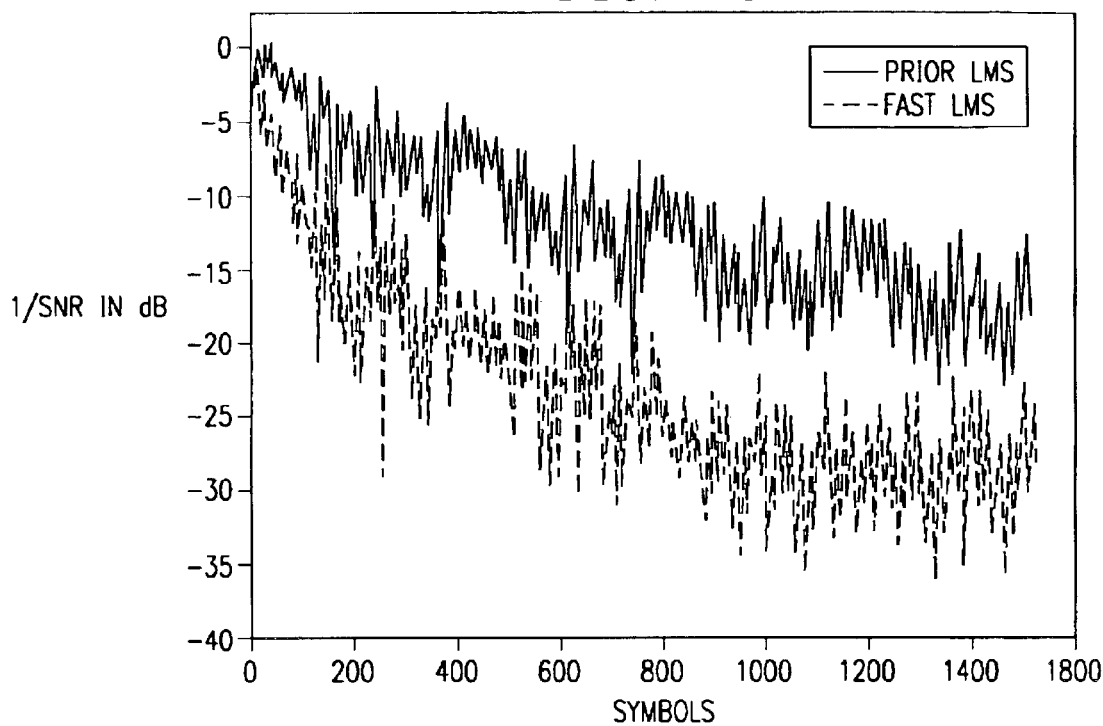
FIG. 10 illustrates a comparison of the convergent speed of an exemplary fast LMS algorithm in accordance with the present invention, and a typical LMS algorithm operating at 4 Mbaud.

A comparison of the convergent speed of the present fast LMS algorithm with an exemplary prior art LMS algorithm is shown in FIGS. 9 and 10 for 2 Mbaud and 4 Mbaud equalizers respectively. Both equalizers are initialized with all zeros. As shown in FIG. 9, for an equalizer operating at 2 Mbaud, it takes 200 2 Mbaud symbols for the equalizer converging to 35 dB SNR to support the maximum size of 8-bit constellation. However, for a 4 Mbaud equalizer, it needs 800 4 Mbaud symbols or 400 2 Mbaud symbols duration to converge. In both cases the circular repetitive training data are re-circled in the process to take advantage of the unique property of preamble TRN16. In the 10M8 specification, there are a total of 34 bytes or 272 2 Mbaud symbols in the header. That is the time period to train the equalizers before an equalizer can be used to decode the payload. As discussed earlier, 4 Mbaud equalizer training requires a 400 2 Mbaud period which is longer then the total header period. Therefore, for 4 Mbaud equalizer training, the training circuits have to run faster than the associated symbol clock and stored repetitive training data is utilized. The training data can be stored in a memory device, for example.

Figure 11:
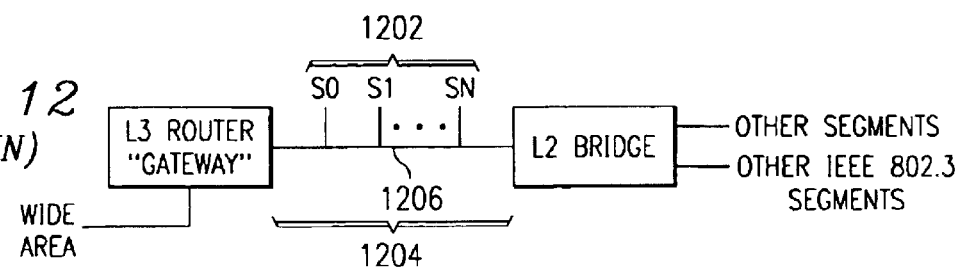
FIG. 11 shows tabulated results of ten 10M8 specified test loops for an exemplary transceiver in accordance with the present invention.

The 10M8 specification defines ten test loops for evaluating the performance of a 10M8 compliant transceiver. The performance of the transceiver according to the present invention was tested (per the 10M8 specification) with a −140 dBm/Hz noise floor and three single-tone interference at 3.75, 7.15, and 10.15 MHz. The peak-to-peak voltage for each single-tone interference was 0.28 volts. The test performance results are represented in the table shown in FIG. 11.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. An apparatus for transceiving a data signal compliant with HomePNA 10M8 technology in an Open System Interconnect network, said apparatus comprising:

a transmitter having an input for coupling to a media access control device for receiving a data signal to be transmitted and operably configured to convert said data signal to an encoded signal, said transmitter further operably configured to filter and digitally modulate said encoded signal compliant with HomePNA mask requirements and output said filtered and digitally modulated signal to a first analog front-end device for transmission to a shared medium;

a receiver having an input for coupling to a second analog front-end device for receiving a HomePNA data signal from said shared medium and operably configured to digitally demodulate, filter and decode a pay-load portion of said HomePNA data signal;

wherein said second analog front-end device having an input for coupling to said shared medium and operably configured to sample and filter said HomePNA data signal, and having an output for coupling to said receiver for outputting a pass-band signal responsive to said received HomePNA data signal;

wherein said receiver further includes
  a digital demodulator having an input for receiving said pass-band signal and operably configured to down-convert said pass-band signal to a base-band signal,
  a raised-cosine filter having an input for coupling to an output of said digital demodulator for receiving said base-band signal, and operably configured to filter down-converted noise from said base-band signal, and
  an equalizer having an input for receiving said filtered base-band signal from an output of said real, low-pass filter and operably configured to reduce inter-symbol interference, said equalizer operates at a first and second rate, wherein said operating rate is defined in preamble portion of said HomePNA data signal.

2. The apparatus of claim 1, wherein said equalizer is operably configured to trained reception for a payload portion of said HomePNA data signal.

3. A method of transceiving a data signal in a HomePNA 10M8 compliant Open System Interconnect network, said method comprising the steps of:

in a transmitter path:
  receiving a data bit stream for transmission from an associated media access controller (MAC);
  encoding said data bit stream into a symbol signal based on said data bit stream at a first or second symbol rate, wherein said symbol rate is defined in a preamble portion of said data bit stream;
  filtering said symbol signal to a resultant first base-band signal;
  digitally modulating said base-band signal to a resultant first pass-band signal centered at approximately 7 MHz;
  filtering a notch into said first pass-band signal centered at approximately 7 MHz; and sending said first pass-band signal centered and notched at approximately 7 MHz to an analog front end device for transmission to a shared medium; and in a receiver path:
receiving a HomePNA data signal from said shared medium;
sampling and filtering said HomePNA data signal to a second pass-band signal responsive to said received HomePNA data signal;
digitally demodulating said second pass-band signal to a down-converted second base-band signal responsive to said received second pass-band signal;
filtering said second base-band signal using a low-pass filtering arrangement, wherein down-converted noise is separated from said second base-band signal;
canceling channel inter-symbol interference from said second base-band signal using a dual equalizer arrangement;
decoding said second base-band signal subsequent to said noise filtering and said channel inter-symbol interference canceling to a representative bit stream.

4. The method of claim 3, wherein said analog front end device further filters said first pass-band signal to comply with HomePNA mask requirements about a 2 MHz frequency region.

5. The method of claim 3, wherein said received HomePNA data signal is converted from an analog signal to a digital signal for further processing in said receiver path.

6. The method of claim 3, wherein said transmitter path and said receiver path are integrated in an application specific circuit.

7. The method of claim 3, wherein said dual equalizer arrangement operates to receive a payload portion of said HomePNA data signal at a first and second rate.

8. The method of claim 7, wherein said first rate and said second rate comprise 2 Mbaud and 4 Mbaud, respectively, wherein said operating rate is defined in a pay-load encoding field of said received HomePNA data signal.

9. The method of claim 7, wherein equalizers of said dual equalizer arrangement are trained to receive a pay-load portion of said HomePNA data signal at said first or said second operating rate prior to receiving said pay-load portion, wherein each equalizer can operate at said first or said second operating rate.

10. The method of claim 3 further including determining a cross correlation function of said received HomePNA data signal and a predetermined training symbol.

11. The method of claim 3 further including, in said receiver path, canceling an echo signal associated with a transmitted signal from said transmitter path.

12. The method of claim 3 further including, in said receiver path, detecting a collision between a transmitted signal associated with said transmitter path and other transmitted signals on said shared medium.

13. The method of claim 12, wherein said collision detection further includes comparing a determined echo signal and said other transmitted signals on said shared medium.

* * * * *